United States Patent
Sherlock

(10) Patent No.: US 11,131,082 B2
(45) Date of Patent: Sep. 28, 2021

(54) WORK VEHICLE WITH A PAYLOAD TRACKING SYSTEM

(71) Applicant: DEERE & COMPANY, Moline, IL (US)

(72) Inventor: Lance R Sherlock, Asbury, IA (US)

(73) Assignee: Deere & Company, Moline, IL (US)

( * ) Notice: Subject to any disclaimer, the term of this patent is extended or adjusted under 35 U.S.C. 154(b) by 224 days.

(21) Appl. No.: 16/439,913

(22) Filed: Jun. 13, 2019

(65) Prior Publication Data
US 2020/0392703 A1     Dec. 17, 2020

(51) Int. Cl.
*E02F 9/26* (2006.01)
*G01F 15/06* (2006.01)
*G01S 19/42* (2010.01)
*G07C 5/02* (2006.01)

(52) U.S. Cl.
CPC .............. *E02F 9/26* (2013.01); *G01F 15/068* (2013.01); *G01S 19/42* (2013.01); *G07C 5/02* (2013.01)

(58) Field of Classification Search
CPC . E02F 9/2054; E02F 9/26; E02F 9/261; E02F 9/264; E02F 9/267; G01F 15/068; G01F 19/42; G07C 5/02
See application file for complete search history.

(56) References Cited

U.S. PATENT DOCUMENTS

| | | | |
|---|---|---|---|
| 5,850,341 A | 12/1998 | Fournier et al. | |
| 6,211,471 B1* | 4/2001 | Rocke | G01G 19/083 177/136 |
| 6,668,157 B1* | 12/2003 | Takeda | H04B 7/155 455/11.1 |
| 7,113,105 B2* | 9/2006 | Sahm | E02F 9/26 172/4.5 |
| 8,515,627 B2* | 8/2013 | Marathe | E02F 3/431 701/50 |
| 8,838,331 B2* | 9/2014 | Jensen | G01N 9/36 701/34.4 |
| 10,094,704 B2 | 10/2018 | Tejeda et al. | |
| 10,101,740 B2 | 10/2018 | Tanaka et al. | |
| 10,108,196 B2 | 10/2018 | Kadono et al. | |
| 10,114,376 B2 | 10/2018 | Kini et al. | |
| 10,119,830 B2 | 11/2018 | Sakai et al. | |
| 10,234,368 B2 | 3/2019 | Cherney | |
| 10,704,228 B2* | 7/2020 | Tsuji | E02F 9/26 |
| 2005/0046599 A1* | 3/2005 | Sahm | E02F 9/26 340/995.1 |

(Continued)

*Primary Examiner* — Tyler J Lee

(57) ABSTRACT

A work vehicle for tracking a payload through a dump cycle having am implement, a volume sensor, a location tracker, an operation sensor, and a computing device. The volume sensor may be configured to sense a volume of material in the implement and generate a corresponding volume data signal. The location tracker may be configured to generate a location data signal indicative of the location of the implement. The operation sensor may be configured to detect an operation characteristic of a dump cycle of the implement and generate an operation data signal indicative of the operation characteristic. The computing device may be operable to execute a payload tracking algorithm to receive the volume data signal, the location data signal, the operation data signal, store the input signal to generate a tracking metric corresponding to the payload.

17 Claims, 4 Drawing Sheets

(56) References Cited

U.S. PATENT DOCUMENTS

| | | | |
|---|---|---|---|
| 2009/0062993 A1* | 3/2009 | Morey | E02F 3/6436 |
| | | | 701/50 |
| 2009/0088961 A1* | 4/2009 | Morey | G01G 23/37 |
| | | | 701/124 |
| 2012/0136542 A1* | 5/2012 | Upcroft | E02F 3/48 |
| | | | 701/50 |
| 2014/0288771 A1* | 9/2014 | Li | G06K 9/00791 |
| | | | 701/34.4 |
| 2017/0278315 A1* | 9/2017 | Christofferson | G07C 5/0825 |
| 2018/0245311 A1* | 8/2018 | Shike | H04N 13/00 |
| 2018/0295357 A1* | 10/2018 | Okumura | B60R 1/00 |
| 2019/0003155 A1* | 1/2019 | Kurogi | H04N 7/18 |
| 2020/0040555 A1* | 2/2020 | Hageman | G01F 22/00 |
| 2020/0165798 A1* | 5/2020 | Nishi | H04N 7/18 |
| 2020/0325655 A1* | 10/2020 | Hageman | E02F 9/265 |

\* cited by examiner

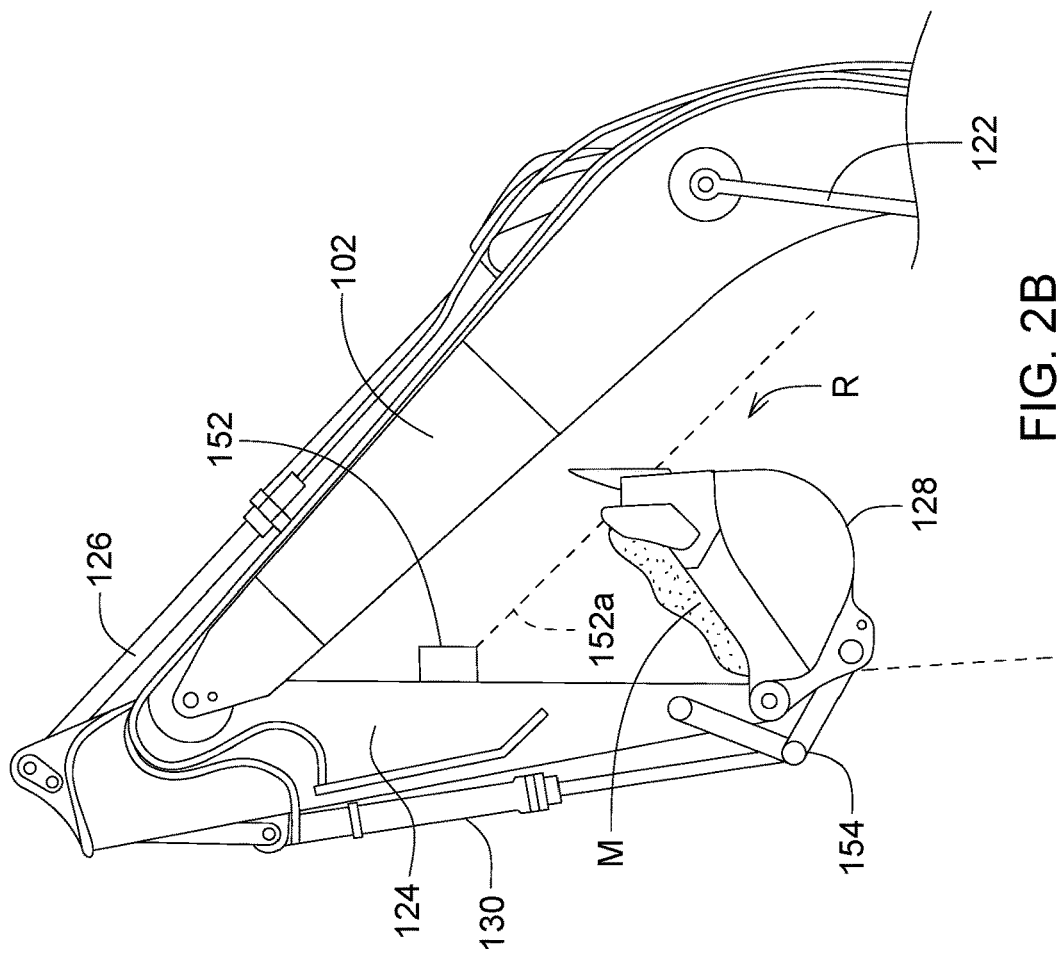
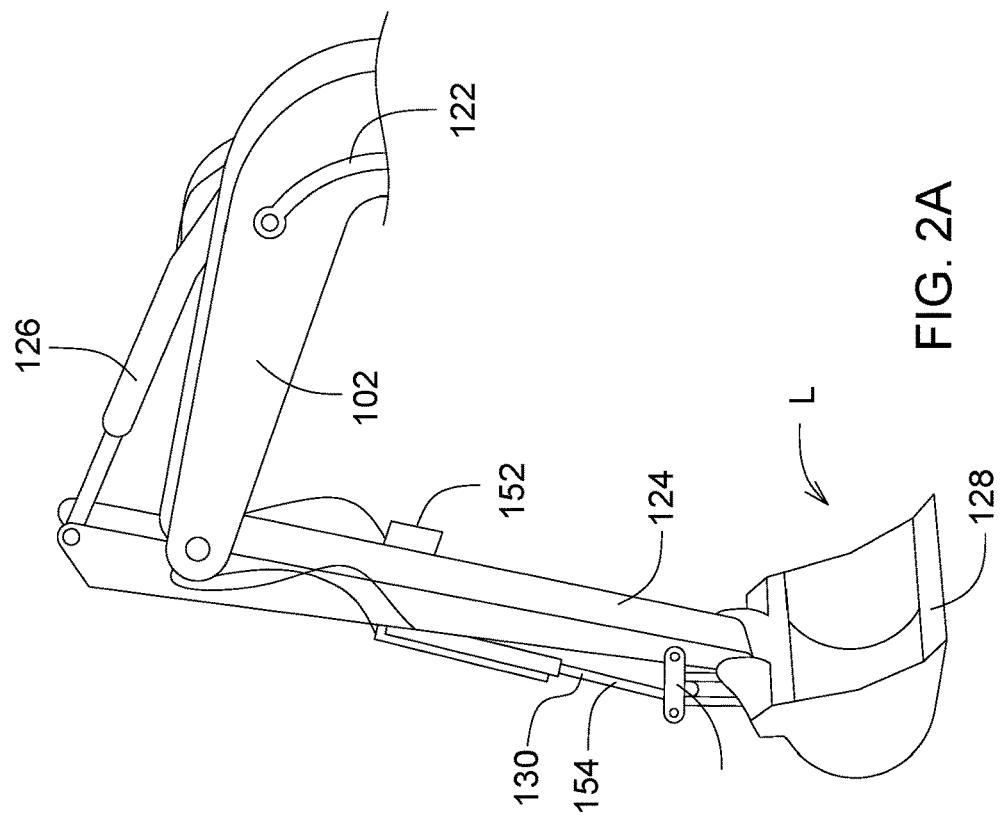
FIG. 2A
FIG. 2B

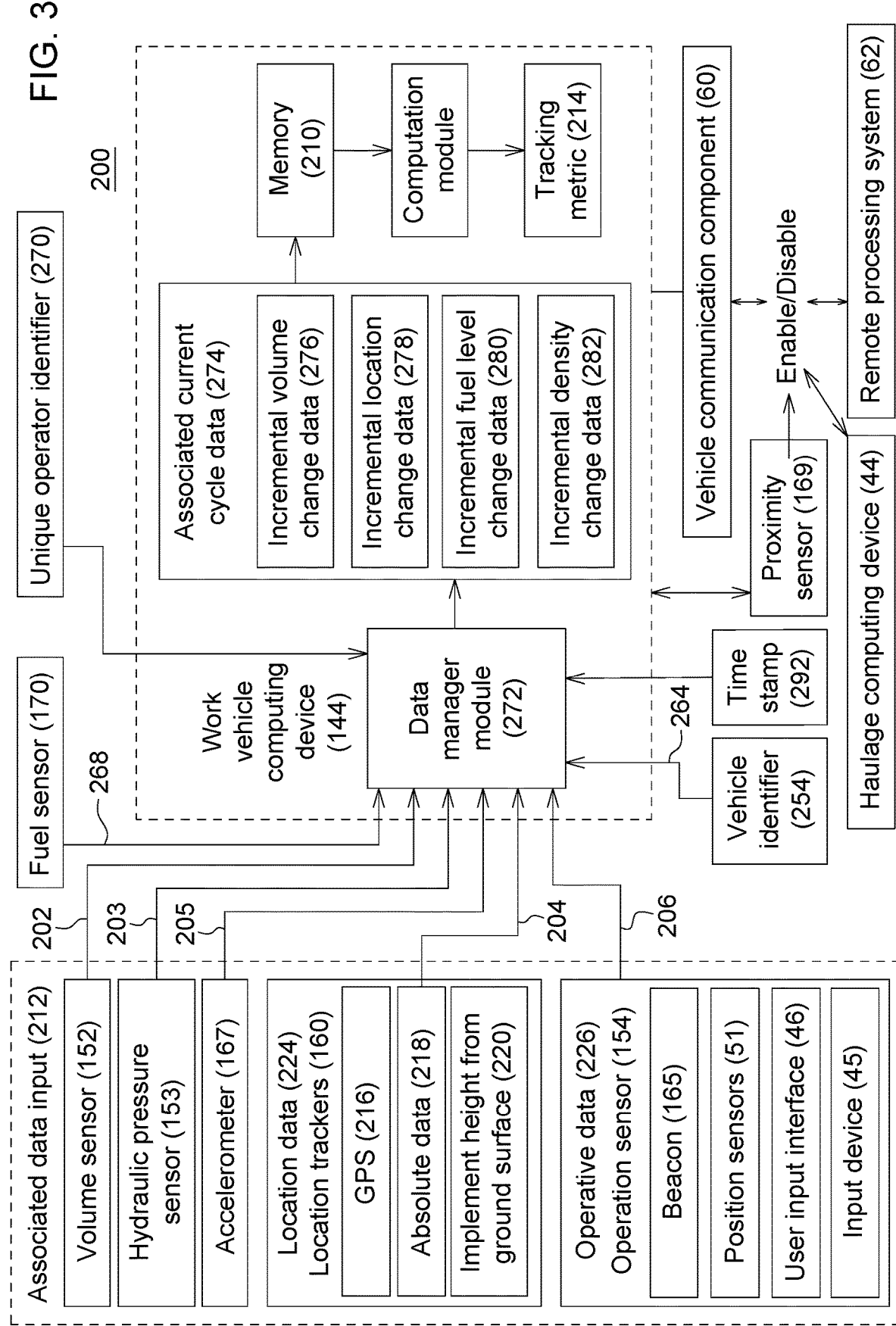

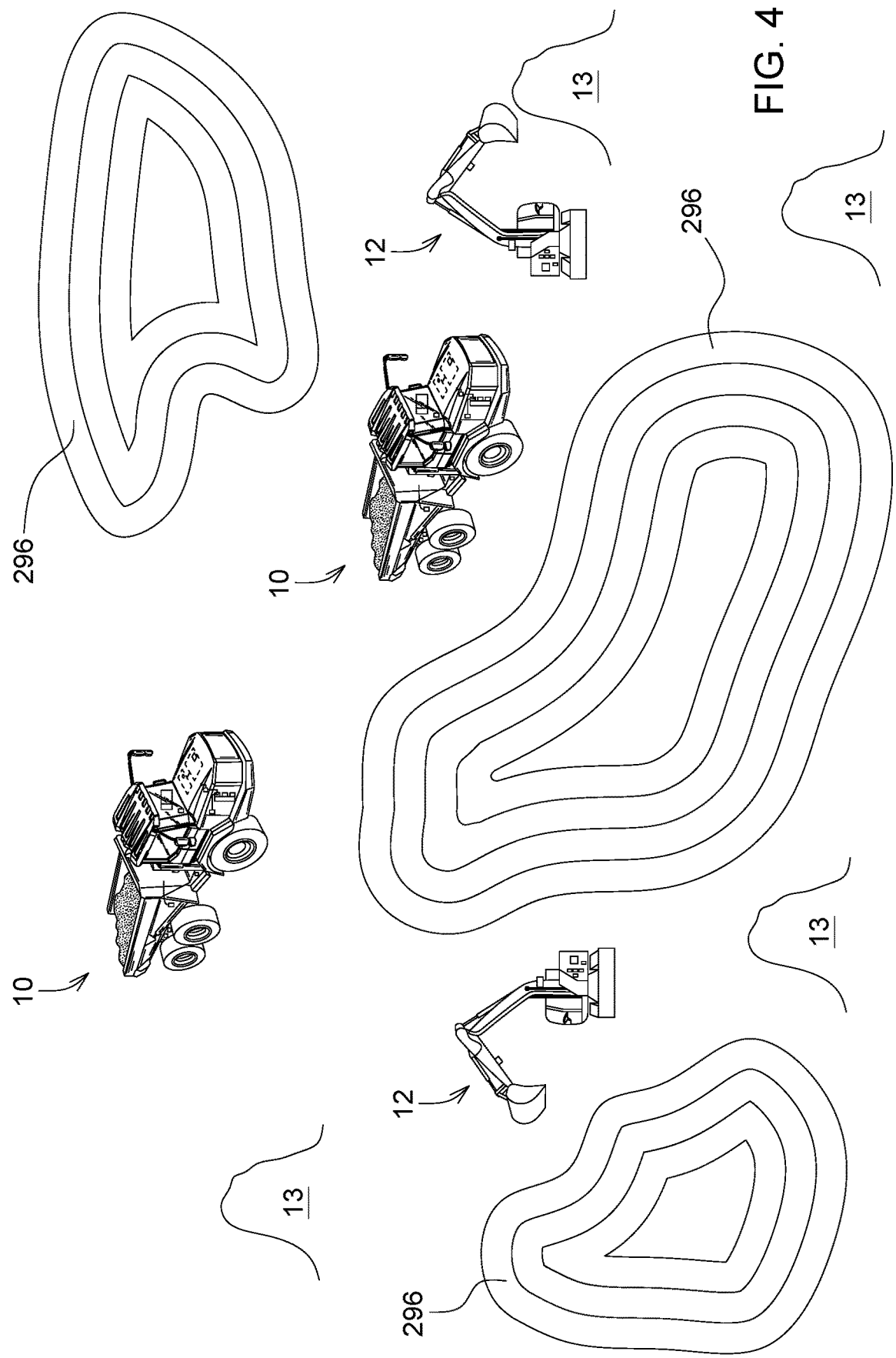

WORK VEHICLE WITH A PAYLOAD TRACKING SYSTEM

CROSS-REFERENCE TO RELATED APPLICATIONS

N/A

FIELD OF THE DISCLOSURE

The disclosure relates to work vehicles and to a payload tracking system to track a payload through a dump cycle.

BACKGROUND

In the construction industry, various work vehicles are operated to perform various tasks at a work site. For example, an excavator or loader may be used to load material into a load bin of an articulated dump truck. The articulated dump truck may be utilized to haul loads of material over rough terrain. Currently to track productivity at a worksite, an operator may generally track progress on a large scale that may be less accurate than desired. Furthermore, although an articulated dump truck may track load moved from a first portion of a work site to a second portion of site, it is unknown whether a payload is moved to a pile, from a pile, with any form of granular detail outlining the volume, density, and form of material moved.

Operators may be compensated based on the volume of material carried over a work cycle, or alternatively, load haulers may be paid based on the density of the materials hauled over the work cycle. In either case, an inaccurate estimated volume or density of materials moved may affect the hauling cost for the work performed at the job site. Inaccuracies in work assessment for a completed project may cause inaccuracies in future job bids. Productivity assessments thus suffer in a similar manner from inaccurate loading/hauling estimates.

SUMMARY

This summary is provided to introduce a selection of concepts that are further described below in the detailed description and accompanying drawings.

The present disclosure includes a work vehicle and system for tracking a payload through a dump cycle.

According to an aspect of the present disclosure, a work vehicle for tracking a payload through a dump cycle may include an implement; a volume sensor configured to sense a volume of material in the implement and generating a corresponding volume data signal; a location tracker configured to generate a location data signal indicative of the location of the implement; an operation sensor configured to detect an operation characteristic of a dump cycle of the implement and generate an operation data signal indicative of the operation characteristic; and a computing device including a processor and a memory having a payload tracking algorithm saved thereon, wherein the processor is operable to execute the payload tracking algorithm. The processor will receive the volume data signal from the volume sensor; receive the location data signal from the location tracker; receive the operation data signal from the operation sensor; associate the volume data of the corresponding volume data signal with the location data of the corresponding location data signal and the operation data of the corresponding operation data signal, together to define an associated data input; and store in memory the associated data input to generate a tracking metric corresponding to the payload.

The operation characteristic may comprise one or more of a load position, a rollback position, and a dump position.

The work vehicle may further include a proximity sensor configured to detect a haulage vehicle within a predefined range, and receive a unique haulage identifier from the haulage vehicle within the predefined ranged. The computing device may associate the associated data input with the unique haulage identifier.

Furthermore, the computing device may transmit the associated data input to a remote processing system located remote from the work vehicle.

The work vehicle may further comprise a fuel sensor configured to sense a level of fuel reserve and generate a corresponding fuel reserve data signal. The computing device receives the fuel reserve data signal and computes a productivity based on fuel reserve data corresponding to the associated data input.

The work vehicle is further configured to detect an operator within the work vehicle, and receive a unique operator identifier from the operator. The computing device associates the associated data with the unique operator identifier.

The location data may comprise of one or more the global positioning system data point, an absolute location data point from known base point, and a relative implement height from the ground surface. The relative implement height from a ground surface identifies a modified topography of the ground surface.

In addition, the remote processing system further comprises a user input interface. The user input interface displays the associated volume data, location data, and operation data from one or more of the work vehicle, the haulage vehicle, other haulage vehicles, and other work vehicles within a worksite area.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 2A is a schematic partial illustration of a boom and bucket of the example loader work vehicle in a load position;

FIG. 2B is a schematic partial illustration of the boom and bucket of the example loader work vehicle in a rollback position;

FIG. 3 is a dataflow diagram illustrating an example payload tracking system for work vehicle in accordance with various work embodiments;

FIG. 4 is an embodiment a user input interface displaying data of a worksite area.

DETAILED DESCRIPTION

Figure 1:
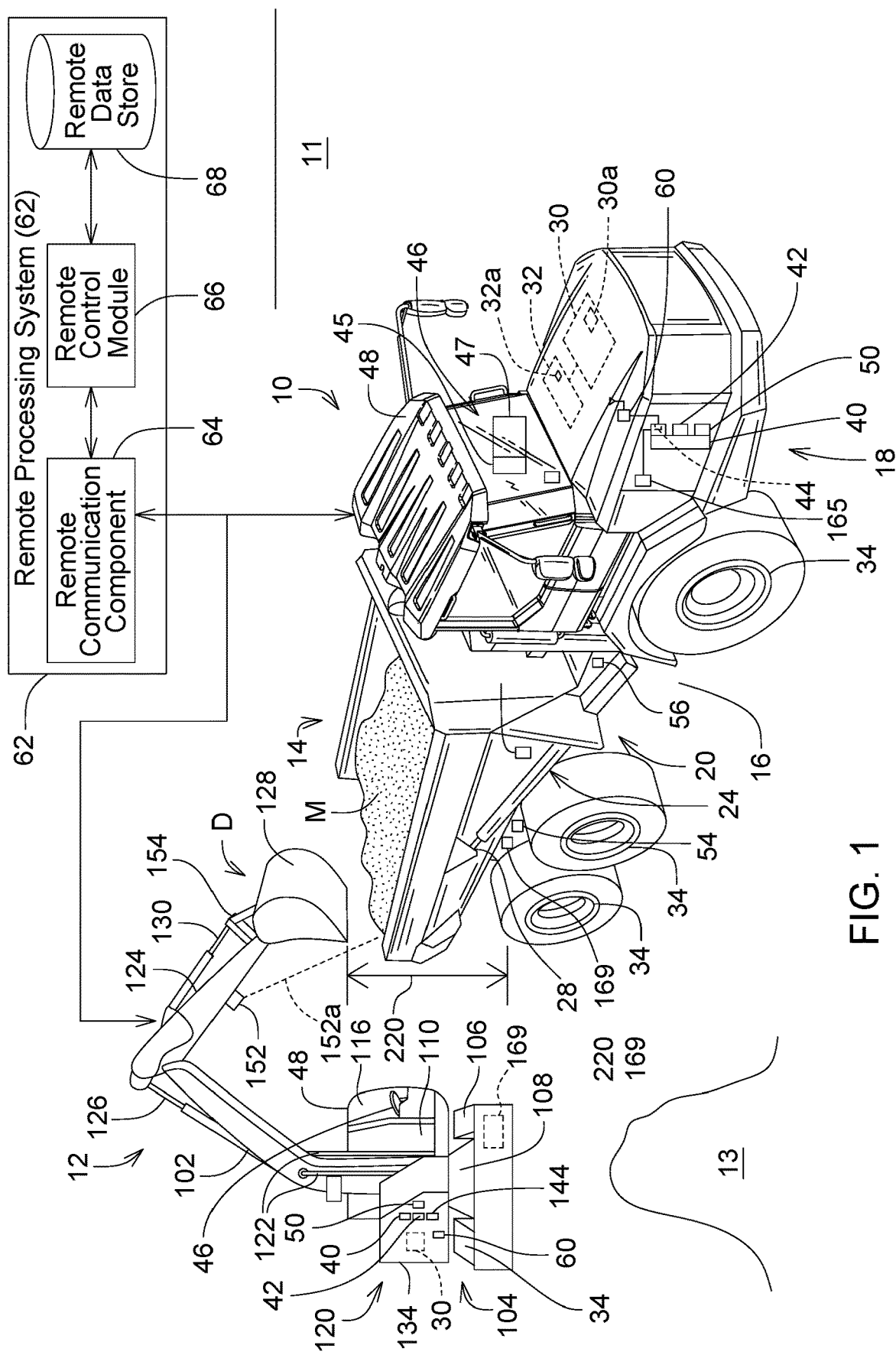
FIG. 1 is a perspective view of an example haulage work vehicle in form of an excavator, in which the disclosed payload tracking system and method may be used.

The embodiments disclosed in the above drawings and the following detailed description are not intended to be exhaustive or to limit the disclosure to these embodiments. Rather, there are several variations and modifications which may be made without departing from the scope of the present disclosure.

As used herein, the term "computing device" refers to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, unless otherwise limited or modified, lists with elements that are separated by conjunctive terms (e.g., "and") and that are also preceded by the phrase "one or more of" or "at least one" of indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g. memory elements, digital signal processing elements, logic elements, look-up table, or the like, which may carry out a variety of functions under the control of one or more microprocessors or other control devices. In addition, those skilled in the will appreciate that embodiments of the present disclosure may be practiced in conjunction with any number of work vehicles, and that the articulated dump truck and the excavator described herein are merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed work vehicle having a payload tracking system, as shown in the accompanying figures of the drawings described briefly above. Generally, the disclosed system (and work vehicles in which they are implemented) provide for improved payload tracking as compared to conventional systems by sensing a volume of material in an implement 128 (shown as bucket) of a work vehicle 12 and/or a volume of material in a load bin 14 of the haulage work vehicle 10, in addition to associating the location of the volume of material from a location tracker 160, identifying the operative state of the work vehicle (10, 12) from an operation sensor 154, and generating signals based thereon. The location data 224 may include the global position system data point (GPS) 216, an absolute location data point from a known base point 218, and/or a relative implement height 220 from a ground surface 11. The volume data signals 202 are processed to determine a volume of material in the bucket 128 and/or the load bin 14. The operation data signals 206 from an operation sensor 154 may include, for example, a beacon 165, or position sensors 51 within the relevant hydraulics of the work vehicle (10, 12), are processed to determine an operative state of the work vehicle. Alternatively, operation data signals 206 may be directly received from an input device 45 from the user input interface 46. Further, by tracking the location data signals 204 in real-time and associating the volume data signals 202 with location data signals 204 in real-time, and associating the operation data signal 206 with the volume data signals 202, to define an associated data input 212, tracking metrics 214 corresponding to a payload M may be generated and stored in memory 210 for the work vehicle (10,12), and additionally aggregate for several work vehicles with several payloads to paint a picture of worksite productivity simultaneously on a granular and a large scale.

Discussion herein may sometimes focus on the example application of the payload tracking system 200 for an excavator. In other applications, other configurations are also possible. For example, work vehicles in some embodiments may be configured as various loaders, including wheel loaders, tractor loaders, crawler loaders or similar machines. Further, work vehicles may be configured as machines other than construction vehicles, including machines from the agriculture, forestry and mining industries, such as tractors, combines, harvesters, feller bunchers, and so on. Thus, the configuration of the payload tracking system 200 for use with an excavator is merely an example. Similarly, the payload tracking system 200 is also described herein with respect to a haulage work vehicle 10 in the form of an articulated dump truck. However, the payload tracking system 200 may be employed with various other haulage machines (e.g. various fixed-chassis dump trucks, commodity carts, or other vehicles with carrying bins and vessels).

Generally, the disclosed payload tracking system 200 includes a volume sensor 152 mounted to an arm coupled to a boom of the work vehicle 12. In one example, the volume sensor 152 is mounted on the boom arm 124 (e.g., a stick boom) near the implement 128 (shown as the bucket in this example), such that a field of view 152a of the volume sensor 152 includes the bucket 128, but may also include the load bin 14 of the haulage work vehicle 10, or a pile 13 on a ground surface 11 based on a position of the arm relative to the haulage work vehicle 10 or, alternatively, the ground surface 11. Thus, the volume sensor 152 is coupled to the work vehicle 12 to observe the volume of materials in the bucket 128, the volume of materials in the load bin 14, and the volume of materials in a pile 13, and generate volume data signals 202 based thereon. In various embodiments, the volume sensor 152 comprises a camera assembly, that captures image data of the bucket 128 and/or load bin 14 and/or pile 13. In other embodiments, the volume sensor 152 is a radar, lidar or similar sensor. In some embodiments, a combination of a camera assembly and a radar, lidar or similar sensor may be employed. Further, in other embodiments, one or more hydraulic pressure sensors may be employed to observe a pressure within one or more hydraulic cylinders associated with the loading work vehicle and to generate pressure sensor signals 203 based on the observation. The pressure sensor signals 203 are indicative of a mass associated with a load in the bucket of the work vehicle. The value of the load may be used to estimate a volume of material if the material and volume of the implement 128 is known. In some embodiments, one or more accelerometers 167 may be employed to observe an acceleration acting on the bucket 128 of the work vehicle 10 and to generate accelerometer sensor signals 205 based on this observation. The acceleration sensor signals 205 are also indicative of a mass associated with a load in the bucket of the work vehicle.

In another aspect of the present disclosure, the payload tracking system 200 includes a location tracker 160 coupled to the implement 128 (e.g. the implement 128 such a bucket on a work vehicle 12, or a load bin 14 for a haulage work vehicle 10). The location tracker 160 is configured to generate a location data signal 204 indicative of the location of the implement 128. In various embodiments, the location data 224 comprises global positioning system data points 216 (or data) acquired from a GPS data tracker. In another embodiment, the location data 224 may comprise absolute location data 230 (or data points) from a known base point. This becomes advantageously helpful in areas with little or no cellular or satellite connectivity, commonly found in construction and forestry worksites. In another embodiment, location data 224 may comprise the relative implement height 220 from a ground surface 11. That is, the relative implement height from a ground surface 11 identifies a modified topography of the ground surface and calculates the relative implement height from that surface (e.g. if the work vehicle 10 is on an incline). Through each dig cycle, location data 224 derived from the GPS data tracker (x-y plane) and the relative implement height from the ground surface (z-direction) during the loading and dumping portions of the dig cycle, renders a visual map (shown in FIG. 3) which details the activity of each work vehicle 12. One or more hydraulic position sensors 51 on of the boom arm(s) (102, 124) may be employed to observe a position within one or more hydraulic cylinders (24, 122,126) associated with the work vehicle 12 and to generate location data signals 204 based on the observation because the implement height relative to the ground-engaging supports is known. In the embodiment of the excavator, the relative orientation of the operator cab 48 having the implement 128, relative to the undercarriage 104 of the work vehicle 12, may also determine the orientation in addition to the relative implement height 232 from a ground surface 11. In another embodiment, an accelerometer 167 coupled to the implement 128 (e.g. the bucket), may communicate wirelessly to a computing device 144 located on the work vehicle 12.

The computing device 144 includes a processor and a memory having a payload tracking algorithm saved thereon. The processor is operable to execute the payload tracking algorithm to implement a method of tracking movement of a payload over a work area by a vehicle, and/or analyzing a tracking metric associated therewith, described in detail below.

Generally, the payload tracking system 200 may include an operation sensor 154 configured to detect an operation characteristic of a dump cycle of the implement 128. In one embodiment, the operation sensor 154 may be the same as the location tracker 160. For example, a beacon 165 generally comprising an accelerometer (167), enables identifying a load position (FIG. 2A), a rollback position (FIG. 2B), and a dump position (exampled shown in FIG. 1) in a dig cycle using decelerative points, and inflections of speed/direction of the implement when graphed. The accelerometer 167 on the beacon 165 may serve to generate both the location data 224 of implement height 232 relative the ground surface 11, and identify an operation characteristic (term may be interchangeably used with operation data 226). Processing and analysis of signals generated by the accelerometer 167 to identify deflections in speed/direction curves to determine a load condition, a rollback position, and a dump position may be done entirely on the computing device 144 of the work vehicle 12, or alternatively gathered on the computing device 144, and finally a remote processing system 62, or somewhere in between.

Generally, the computing device 144 of the work vehicle 12 acquires the volume data signal 202 based on a position of the bucket 128. For example, when the bucket 128 is determined to be in a rollback position (FIG. 2B) based on the operation data 226, the computing device 144 acquires a volume data signal 202. The volume data signal 202 is processed by the computing device 144, and a volume of material within the bucket 128 and/or load bin 14 as acquired by the volume sensor 152, and is associated with the location data 224 of a location data signal 204, the operation data 226 of the corresponding operation data signal 206, together to define an associated data input 212. The computing device 144 of the work vehicle may then store in memory 210 the associated data input 212 to generate a tracking metric 214 corresponding to the payload M.

In one exemplary embodiment, the associated data input 212 may be transmitted by the computing device 144 of the work vehicle 12 to a computing device 44 of a haulage work vehicle 10. This may be triggered by one of various proximity sensors 169 configured to detect a haulage work vehicle 10 within a predefined range of the work vehicle 12, and receive a unique vehicle identifier 254 from the haulage vehicle 10 within the predefined ranged. The unique vehicle identifier 254 may be a beacon 165 intermittently emitting a unique haulage identifier code 264 wherein a second beacon 165 is coupled to the haulage work vehicle 10. Recognition of the unique haulage identifier 264 code by the work vehicle 12 communicatively couples the computing device 144 of the work vehicle with the computing device 44 of the haulage work vehicle 10.

Alternatively, in the absence of a haulage work vehicle 10 wherein the proximity sensor 169 is not triggered, the volume data signal 202 is processed by the computing device 144 on the work vehicle 12 or in the remote processing system 62, and a volume of material within the bucket as acquired by the volume sensor 152 is stored in memory 210 and/or transmitted to a remote processing system 62 with the corresponding location data 224 of the payload M, thereby tracking the volume of material, or payload M, with location data 224 through a dump cycle 266. In the absence of a haulage work vehicle 10, the computing device 144 does not communicatively couple to the haulage computing device 44, to track movement of the payload from the implement 128 to bin 14. Rather, in the absence of a haulage work vehicle 10, the computing device 144 tracks movement of the implement 128 (e.g. in an excavator, the carriage may turn a full circle to load the payload from a first position and dump the payload to a second position in a pile 13 while remaining stationary), associating location data with a first position of implement 128 wherein loading of the material occurs, and a second location of implement 128 wherein dumping of the material occurs. The dump position (shown in FIG. 1) following a rollback position (shown in FIG. 1b) identifies relocation of the payload M, documenting the payload's movement at a worksite from when it was initially loaded to when it was finally dumped. Furthermore, the load position of the implement 128 preceding the rollback position of the implement 128 identifies removal of the payload M from a ground surface 11. In one exemplary scenario, a compilation of data may indicate formation of a trench or basement as the computing device tracks the associated data input 212 for each subsequent dig cycle 266. This can be mapped on a user input interface, such as but not limited to, a display (exemplary embodiment shown in FIG. 4), to outline the productivity and progress made at a work site.

Generally, the computing device 144 of the work vehicle 12 may also acquire a fuel reserve data signal 268 from a fuel sensor 170 configured to sense a level of fuel reserve of the work vehicle 12. The processor within the computing device 144 calculates the respective fuel level change during an operation cycle, or alternatively for other time frames (e.g. a work cycle).

Generally, the computing device 144 of the work vehicle 12 may also acquire a unique operator identifier 270 from the operator of the work vehicle 12. This may occur when the work vehicle 12 is configured to detect a presence of the operator within the operator cab 48 of the work vehicle 12, and subsequently prompting the operator to enter a unique operator identifier (e.g. a code, biometric data, auto face-recognition technology, selecting a pre-uploaded coded for worksite job, etc.). Detecting a presence of the operator within the operator cab may include, but is not limited to, turning the work vehicle on, a pressure sensor on the cab seat, an alert when the ingress/egress opening is swung open, to name a few.

A computing device 44 of the haulage work vehicle 10 receives the volume data, location data, and optionally, receives a mass data signal from a load sensor coupled to the load bin 14. The computing device 44 of the haulage work vehicle 10 associates the volume data 152, location data signal 224, and a determined mass in the load bin with an operation characteristic of haulage work vehicle (i.e. rollback or dump for a haulage work vehicle 10) whereby the material in bin 14 or payload is tracked with the location data 224. For example, identifying an operation characteristic of the load bin in a rollback position generates and tracks location data 224 as the haulage vehicle moves from a first location to a second location, or more specifically GPS data points 216 and/or absolute location data 218 from a base point, because the haulage work vehicle 10 is moving payload M to a second location. Identifying an operation characteristic of the load bin 14 in a dump position may also identify, record, and store payload M at a second location. This associated data 212 is stored in a memory 210 or datastore. The computing device 44 of the haulage work vehicle 12 may also calculate a density based on the current volume data and mass data, and stores this data with the associated data 212 in the memory 210. The computing device 44 repeats this process over a loading cycle of the haulage work vehicle 10, such that upon completion of the loading cycle, the memory or datastore includes the volume, location, the mass, the density, fuel reserve, unique operator identifier, and the unique haulage identifier code for the particular haulage work vehicle 10 for each of the particular bin loads or load cycles. This data may be transmitted by the computing device 44 to a remote processing system 62, such as a telematics system, to enable access to this data by a remote user. The computing device may also calculate a total density for the loading cycle, which may also be transmitted to the remote processing system 62.

The computing device 44 may also calculate incremental change, or referred to as associated current cycle data 274 between each of the bucket load cycles. For example, the computing device may calculate incremental changes in volume 276, location, 278, fuel, 280, and density 282, etc. between each load cycle of the work vehicle 12. This data may also be transmitted to the remote processing system 62.

As noted above, the disclosed payload tracking system and vehicle may be utilized with regard to various work vehicles, including articulated dump trucks, loaders, graders, tractors, combines, semi-truck haulers, etc. As previously described, in some embodiments, the disclosed payload tracking system 200 may be used with a work vehicle 12, such as an excavator, to assess a volume of material loaded by the work vehicle 12 into a subsequent location such as the haulage work vehicle 10, or a second portion of the ground surface 11, such as a pile 13. In the example of FIG. 1, the haulage work vehicle 10 includes a load bin 14 mounted to a vehicle frame 16. It will be understood that the configuration of the haulage work vehicle 10 having the load bin 14 is presented as an example only.

In the embodiment depicted, the vehicle frame 16 includes a first, front frame portion 18 and a second, rear frame portion 20, which are coupled together via an articulation joint (not shown) to enable pivotal movement between the front frame portion 18 and the rear frame portion 20. The load bin 14 is mounted to the rear frame portion 20 via coupling pins that define a pivot point for the load bin 14. The load bin 14 defines a receptacle to receive a payload M of materials.

One or more hydraulic cylinders 24 are mounted to the rear frame portion 20 and to the load bin 14, such that the hydraulic cylinders 24 may be driven or actuated in order to pivot the load bin 14 about the coupling pins. Generally, the haulage work vehicle 10 includes two hydraulic cylinders 24, one on a left side of the load bin 14 and one on a right side of the load bin 14 in a forward driving direction of the haulage work vehicle 10. It should be noted, however, that the haulage work vehicle 10 may have any number of hydraulic cylinders, such as one, three, etc. Each of the hydraulic cylinders 24 includes an end mounted to the rear frame portion 20 at a pin 26 and an end mounted to the load bin 14 at a pin 28. Upon activation of the hydraulic cylinders 24, the load bin 14 may be moved from a lowered, load position (FIG. 1) to a raised, unloaded dump position (not shown) to dump a payload.

Thus, in the embodiment depicted, the load bin 14 is pivotable vertically relative to a horizontal axis by the one or more hydraulic cylinders 24. In other configurations, other movements of a load bin may be possible. Further, in some embodiments, a different number or configuration of hydraulic cylinders or other actuators may be used. Thus, it will be understood that the configuration of the load bin 14 is presented as an example only. In this regard, a load bin (e.g., the load bin 14) may be generally viewed as a receptacle that is pivotally attached to a vehicle frame. Similarly, a coupling pin (e.g., the coupling pins) may be generally viewed as a pin or similar feature effecting pivotal attachment of a load bin to a vehicle frame. In this light, a tilt actuator (e.g., the hydraulic cylinders 24) may be generally viewed as an actuator for pivoting a receptacle with respect to a vehicle frame.

The haulage work vehicle 10 includes a source of propulsion, such as an engine 30. The engine 30 supplies power to a transmission 32. In one example, the engine 30 is an internal combustion engine, such as a diesel engine, that is controlled by an engine control module 30a. It should be noted that the use of an internal combustion engine is merely an example, as the propulsion device may be a fuel cell, an electric motor, a hybrid-gas electric motor, etc.

The transmission 32 transfers the power from the engine 30 to a suitable driveline coupled to one or more driven ground engaging supports 34 (wheels or tracks) of the haulage work vehicle 10 to enable the haulage work vehicle 10 to move. As is known to one skilled in the art, the transmission 32 may include a suitable gear transmission, which may be operated in a variety of ranges containing one or more gears, including, but not limited to a park range, a neutral range, a reverse range, a drive range, a low range, etc. In one example, the transmission 32 is controlled by a transmission control module 32a.

The haulage work vehicle 10 also includes one or more pumps 40, which may be driven by the engine 30 of the haulage work vehicle 10. Flow from the pumps 40 may be routed through various control valves 42 and various conduits (e.g., flexible hoses) in order to drive the hydraulic cylinders 24. Flow from the pumps 40 may also power various other components of the haulage work vehicle 10. The flow from the pumps 40 may be controlled in various ways (e.g., through control of the various control valves 42), in order to cause movement of the hydraulic cylinders 24, and thus, movement of the load bin 14 relative to the vehicle frame 16. In this way, for example, a movement of the load bin 14 between the lowered, loaded position (FIG. 1) and the raised, unloaded position (not shown) may be implemented by various control signals to the pumps 40, control valves 42, and so on.

Generally, a haulage computing device 44 (or multiple computing device s) may be provided, for control of various aspects of the operation of the haulage work vehicle 10, in general. The haulage computing device 44 (or others) may be configured as a computing device with associated processor devices and memory architectures, as a hard-wired computing circuit (or circuits), as a programmable circuit, as a hydraulic, electrical or electro-hydraulic computing device, or otherwise. As such, the haulage computing device 44 may be configured to execute various computational and control functionality with respect to the haulage work vehicle 10 (or other machinery). In some embodiments, the haulage controller 44 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the haulage controller 44 (or a portion thereof) may be configured as an assembly of hydraulic components (e.g., valves, flow lines, pistons and cylinders, and so on), such that control of various devices (e.g., pumps or motors) may be affected with, and based upon, hydraulic, mechanical, or other signals and movements.

The haulage computing device 44 may be in electronic, hydraulic, mechanical, or other communication with various other systems or devices of the haulage work vehicle 10 (or other machinery). For example, the haulage computing device 44 may be in electronic or hydraulic communication with various actuators, sensors, and other devices within (or outside of) the haulage work vehicle 10, including various devices associated with the pumps 40, control valves 42, and so on. The haulage computing device 44 may communicate with other systems or devices (including other controllers, such as a computing device 144 of the work vehicle 12) in various known ways, including via a CAN bus (not shown) of the haulage work vehicle 10, via wireless or hydraulic communication means, or otherwise. An example location for the haulage computing device 44 is depicted in FIG. 1. It will be understood, however, that other locations are possible including other locations on the haulage work vehicle 10, or various remote locations.

In some embodiments, the haulage computing device 44 may be configured to receive input commands and to interact with an operator via a user input interface 46, which may be disposed inside an operator cab 48 of the haulage work vehicle 10 for easy access by the operator. The user input interface 46 may be configured in a variety of ways. In some embodiments, the user input interface 46 may include an input device 45 comprising one or more joysticks, various switches or levers, one or more buttons, a touchscreen interface that may be overlaid on a display 47, a keyboard, a speaker, a microphone associated with a speech recognition system, or various other human-machine interface devices. The user input interface 46 also includes the display 47, which may be implemented as a flat panel display or other display type that is integrated with an instrument panel or console of the haulage work vehicle 10. Those skilled in the art may realize other techniques to implement the display 47 in the haulage work vehicle 10.

Various sensors may also be provided to observe various conditions associated with the haulage work vehicle 10. In some embodiments, various sensors 50 (e.g., pressure, flow, position, or other sensors) may be disposed near the pumps 40 and control valves 42, or elsewhere on the haulage work vehicle 10. For example, sensors 50 may include one or more pressure sensors that observe a pressure within the hydraulic circuit, such as a pressure associated with one or more of the one or more hydraulic cylinders 24. The sensors 50 may also observe a pressure associated with the pumps 40. Sensors may also include position sensors 51 that observe the extension and retraction of one or more hydraulic cylinders. In some embodiments, various sensors may be disposed near the load bin 14. For example, sensors 52 (e.g. load sensors) may be disposed on or coupled near the load bin 14 in order to measure parameters including the payload M in the load bin 14 and so on. For example, sensors 52 may observe a mass of the material M in the load bin 14 and generate a mass data signal based thereon.

Various operation sensors 154 may also be disposed on or near the rear frame portion 20 in order to measure parameters, such as an incline or slope of the rear frame portion 20, and so on. In some embodiments, the operation sensors 154 may include an inclinometer 54 coupled to or near the rear frame portion 20, etc. In certain embodiments, operation sensor 154 may include various sensors 56 disposed near the rear frame portion 20 in order to observe an orientation of the load bin 14 relative to the rear frame portion 20. In some embodiments, the sensors 56 include angular position sensors coupled between the rear frame portion 20 and the load bin 14 in order to detect the angular orientation of the load bin 14 relative to the rear frame portion 20. The various operation sensors 154 noted above (or others) may be configured to detect an operation of a dump cycle of the load bin 14 via control of the movement of the one or more hydraulic cylinders 24. Each of the sensors 50, 52, 54 and 56, and the user input interface 46, may be in communication with the haulage computing device 44 via a suitable communication architecture, such as the CAN bus associated with the haulage work vehicle 10. Sensors 54 and 56 are exemplary embodiments of operations sensors of one type work vehicle, the haulage work vehicle, wherein the operation signals are indicative either a rollback position (i.e. a carry position) or a dump position.

The haulage work vehicle 10 includes a vehicle communication component 60. The vehicle communication component 60 enables communication between the haulage computing device 44, the work vehicle computing device 144 and a remote processing system 62. The vehicle communication component 60 comprises any suitable system for receiving data from and transmitting data to the work vehicle computing device 144 and/or remote system 62. For example, the vehicle communication component 60 may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The vehicle communication component 60 also transmits data to the remote station (not shown) to achieve bi-directional communications. However, other techniques for transmitting and receiving data may alternately be utilized. In one example, the vehicle communication component 60 achieves bi-directional communications with the work vehicle controller 144 and/or the remote system 62 over Bluetooth®, satellite or by utilizing a Wi-Fi standard, as is well known to those skilled in the art. Thus, the vehicle communication component 60 comprises a Bluetooth® transceiver, a satellite transceiver, a radio transceiver, a cellular transceiver, an LTE transceiver and/or a Wi-Fi transceiver.

In certain embodiments, the vehicle communication component 60 is in communication with the remote system 62. In one example, the remote system 62 comprises the JDLink™ telematics system commercially available from Deere & Company of Moline, Ill.; however, the remote system 62 may comprise any suitable telematics system. The remote system 62 includes a remote communication component 64, a remote control module 66 and one or more remote data stores 68. The remote communication component 64 comprises any suitable system for receiving data from and transmitting data to the vehicle communication component 60 and a vehicle communication component 60 associated with the work vehicle 12. For example, the remote communication component 64 may include a radio configured to receive data transmitted by modulating a radio frequency (RF) signal from a remote station (not shown) as is well known to those skilled in the art. For example, the remote station (not shown) may be part of a cellular telephone network and the data may be transmitted according to the long-term evolution (LTE) standard. The remote communication component 64 also transmits data to the remote station (not shown) to achieve bi-directional communications. However, other techniques for transmitting and receiving data may alternately be utilized. For example, the remote communication component 64 may achieve bi-directional communications with the vehicle communication component 60, 160 over Bluetooth®, satellite, or by utilizing a Wi-Fi standard. Thus, the remote communication component 64 comprises a Bluetooth® transceiver, a radio transceiver, a cellular transceiver, a satellite transceiver, an LTE transceiver and/or a Wi-Fi transceiver.

The remote communication component 64 may also be configured to encode data or generate encoded data. The encoded data generated by the remote communication component 64 may be encrypted. A security key may be utilized to decrypt and decode the encoded data, as is appreciated by those skilled in the art. The security key may be a "password" or other arrangement of data that permits the encoded data to be decrypted.

The remote control module 66 is in communication with the remote communication component 64 and the one or more remote data stores 68 over a suitable interconnection architecture or arrangement that facilitates transfer of data, commands, power, etc. The remote control module 66 may also be in communication with one or more remote users via a portal, such as a web-based portal. The remote control module 66 may be configured as a computing device with associated processor devices and memory architectures, as a hard-wired computing circuit (or circuits), as a programmable circuit, or otherwise. The remote control module 66 receives associated input data 212, operator identifier data 270, fuel level data 170, timestamps 292, and vehicle identifier data 254 communicated from the vehicle communication component 60 and sets data, such as incremental volume change data 276, incremental location change data 278, incremental fuel level change data and incremental density change data 282 for each associated current cycle for a particular work vehicle 10 for one or more of the remote data stores 68. In one example, one or more of the one or more remote data stores 68 may be stored in any desired format, and may comprise one or more tables. The tables may be indexed by work vehicle identifier, etc. to enable retrieval of the associated input data upon a request received from a remote user in communication with the remote control module 66 via the web-based portal. Additionally, the remote processing system may further comprise a user input interface 46. The user input interface displays the associated volume data, location data, and operation data from one or more of the work vehicle, the haulage vehicle, other haulage vehicles and other work vehicles within a worksite area. The user input interface 46 may display this data in real-time, or alternatively updated at time intervals. This can be displayed in chartable tables, or alternatively in graphical format displaying movement of payloads across a worksite, color-coding changes, or lines in topography 296 to indicate the depth of trench, or a height of a pile (as shown in FIG. 4).

Now returning to FIGS. 1, 2A, and 2B, the work vehicle 12 includes an upper frame 102 pivotally mounted to an undercarriage 104. The upper frame 120 may be pivotally mounted on the undercarriage 104 by means of a swing pivot 108. The upper frame 120 is rotatable about 360 degrees relative to the undercarriage 104 on the swing pivot 108. A hydraulic motor (not shown) may drive a gear train (not shown) for pivoting the upper frame 102 about the swing pivot 108.

The undercarriage 104 may include a pair of ground-engaging supports 34 (shown as tracks) on opposite sides of the undercarriage 104 for moving along the ground surface 11. Alternatively, the loading work vehicle 12 may include wheels for engaging the ground. The upper frame 102 includes a cab 110 in which the machine operator controls the machine. The cab 110 includes a user input interface 46.

The work vehicle 12 also includes a large boom 120 that extends from the upper frame 102 adjacent to the cab 46. The boom 102 is rotatable about a vertical arc by actuation of a pair of boom hydraulic cylinders 122. A dipper stick or arm 124 is rotatably mounted at one end of the boom 102 and its position is controlled by a hydraulic cylinder 126. The opposite end of the boom 120 is coupled to the upper frame 102. At the end opposite the boom 120, the dipper stick or arm 124 is mounted to an excavator bucket 128 that is pivotable relative to the arm 124 by means of a hydraulic cylinder 130.

The upper frame 102 of the work vehicle 12 includes an outer shell cover to protect a propulsion system, such as an engine 30. At an end opposite the cab 110, the upper frame 102 includes a counterweight body 134. The counterweight body 134 comprises a housing filled with material to add weight to the machine and offset a load collected in the bucket 128. The offset weight may improve the digging performance of the work vehicle 12.

The work vehicle 12 also includes one or more pumps 40, which may be driven by the engine 30 of the work vehicle 12. Flow from the pumps 40 may be routed through various control valves 42 and various conduits (e.g., flexible hoses) in order to drive the hydraulic cylinders 122, 126, 130. Flow from the pumps 40 may also power various other components of the work vehicle 12. The flow from the pumps 40 may be controlled in various ways (e.g., through control of the various control valves 42), in order to cause movement of the hydraulic cylinders 122, 126, 130, and thus, movement of the bucket 128 relative to the upper frame 102. In this way, for example, a movement of the bucket 128 between a load position L to load a material M (FIG. 1A) and a rollback position R to carry the material M (FIG. 1B) may be implemented by various control signals to the pumps 40, control valves 42, and so on.

Generally, the work vehicle computing device 144 (or multiple controllers) may be provided, for control of various aspects of the operation of the work vehicle 12. Similar to the haulage computing device 44, the work vehicle computing device 144 may be in electronic, hydraulic, mechanical, or other communication with various other systems or devices of the work vehicle 12 (or other machinery). For example, the work vehicle computing device 144 may be in electronic or hydraulic communication with various actuators, sensors, and other devices within (or outside of) the work vehicle 12, including various devices associated with the pumps 40, control valves 42, and so on.

Various sensors may also be provided to observe various conditions associated with the work vehicle 12. In some embodiments, various sensors 50 (e.g., pressure, flow, position or other sensors) may be disposed near the pumps 40 and control valves 42, or elsewhere on the work vehicle 12. For example, sensors 50 may include one or more pressure sensors that observe a pressure within the hydraulic circuit, such as a pressure associated with one or more of the one or more hydraulic cylinders 122, 126, 130 and generate sensor signals based the observation. Based on the pressure observed within the hydraulic cylinders 122, 126, 130, the loader controller 144 determines a mass of a load within the bucket 128. The sensors 50 may also observe a pressure associated with the pumps 40. In some embodiments, various sensors may be disposed near the bucket 128. For example, one or more accelerometers may be employed to observe an acceleration acting on the bucket 128 of the work vehicle 12 and to generate sensor signals based on this observation. The work vehicle computing device 144 receives these sensor signals and processes the sensor signals to determine a mass of a load within the bucket 128.

A volume sensor 152 may be disposed on or coupled to the arm 124 in order to measure parameters including the volume of the material M (FIG. 1B) in the bucket 128 and/or a volume of material M within the load bin 14 (FIG. 1) and so on. It should be noted that the position of the sensor 152 in FIGS. 1-1B is merely exemplary, as the sensor 152 may be mounted at any desired position on the work vehicle 12 to observe the volume of the material M (FIG. 1B) in the bucket 128 and/or a volume of material M within the load bin 14 (FIG. 1), and generate sensor signals based thereon. In addition, the work vehicle 12 may include more than one sensor 152 to observe the volume of material in the load bin 14 and the bucket 128.

In this example, with reference to FIG. 1B, the sensor 152 is mounted to or associated with the work vehicle 12 (or otherwise positioned) in order to capture images at least of a field of view 152a, which in this example, includes the bucket 128 of the work vehicle 12 when the bucket 128 is in the rollback position R, the load bin 14 of the haulage work vehicle 10 when the bucket 128 is in the dump position D, and a pile 13 on the surface 11 when in the dump position D. The volume sensor 152 may be in electronic (or other) communication with the loader controller 144 (or other devices) and may include various numbers of cameras of various types. In certain embodiments, the volume sensor 152 may include a color camera capable of capturing color images. In other embodiments, the volume sensor 152 may include an infrared camera to capture infrared images. In certain embodiments, the volume sensor 152 may include a grayscale camera to capture grayscale images. In other embodiments, the volume sensor 152 may include a stereo camera assembly capable of capturing stereo images. For example, the volume sensor 152 may include a stereo camera with two or more lenses and image sensors, or multiple cameras arranged to capture stereoscopic images of the field of view 152a, including the volume of material M within the bucket 128 and/or the load bin 14 within the field of view 152a.

Images may be captured by the volume sensor 152 according to various timings or other considerations, and the image data or image streams may include location data acquired from the location tracker 160. In certain embodiments, for example, the volume sensor 152 may capture images continuously based on a position of the bucket 128, such as the position of the bucket 128 in the rollback position R (FIG. 2B) or the dump position D (FIG. 1). In certain embodiments, embedded control system (not shown) for the volume sensor 152 may cause the volume sensor 152 to capture images of the field of view 152a at regular time intervals as work vehicle 12 executes a load cycle. In addition, one or more input devices 45 of the user input interface 46 interface 114 may also be used to cause the volume sensor 152 to capture images of the field of view 152a.

The volume sensor 152 provides a source of local image data for the work vehicle computing device 144. It will be understood that various other sources of image data for the work vehicle computing device 144 may be available. For example, a portable electronic device (not shown) may provide a source of image data for the work vehicle computing device 144 (i.e. as a source of remote image data). The portable electronic device may be in communication with the work vehicle 12 to transmit data to a vehicle communication component 60 associated with the work vehicle 12 and to receive the data from the vehicle communication component 60. The portable electronic device is any suitable electronic device external to the work vehicle 12, including, but not limited to, a hand-held portable electronic device, such as a tablet computing device, mobile or smart phone, personal digital assistant, a laptop computing device, etc.

Various operation sensors 154 (e.g. bucket position sensors) may also be disposed on or near the bucket 128 in order to measure parameters, such as an orientation of the bucket 128 relative to the arm 124, such as whether the bucket 128 is in the load position L (FIG. 1A), the rollback position R (FIG. 1B) or the dump position D (FIG. 1). In some embodiments, the operation sensors 154 include angular position sensors coupled between the arm 124 and the bucket 128 in order to detect the angular orientation of the bucket 128 relative to the arm 124.

The various components noted above (or others) may be utilized to control movement of the bucket 128 via control of the movement of the one or more hydraulic cylinders 122, 126, 130. Accordingly, these components may be viewed as forming part of the payload tracking system 200 for the work vehicle 12. Each of the operation sensors 154, the mass sensors, and the user input interface 46 are in communication with the work vehicle computing device 144 via a suitable communication architecture, such as a CAN bus.

The work vehicle 12 includes a vehicle communication component 60. The vehicle communication component 60 enables communication between the work vehicle computing device 144, the haulage computing device 44 and the remote system 62. The vehicle communication component 160 comprises any suitable system for receiving data from and transmitting data to the haulage controller 44 and/or remote system 62.

Additionally, the work vehicle 12 may comprise one or more proximity sensors 51 configured to detect a haulage work vehicle 10 within a predefined a range, and receive a unique haulage identifier code 264 from the haulage vehicle within the predefined range may also be used. The predefined range may be defined as an approximate perimeter wherein a bin 14 of the haulage vehicle 10 is accessible by the implement 128 of the work vehicle 10 during a dump cycle. In other words, the bin 14 of the haulage vehicle 10 must be close enough for the work vehicle 12 to dump a payload in. The proximity sensor 51, upon activation, communicatively couples computing device 144 on work vehicle with computing device 44 on the haulage vehicle. Once activated, the communicative coupling may occur automatically, or alternatively, the communicative coupling may occur with an enable request signal, wherein the operator must accept to complete communicative coupling between the computing device 44 and computing device 144. Communicative coupling of the computing devices (44, 144) allows the associated input data 212 to transfer from the work vehicle 12 to the haulage vehicle 10, and associate the unique vehicle identifier 254 with the associated input data 212 received from computing device 144 for payload tracking and stores this information in memory 210. As the bin 14 of the haulage vehicle 10 becomes full, and is ready for departure, the computing devices (44, 144) decouple, the payload is then geo-tracked to the destination of haulage vehicle 10.

Referring now to FIG. 3, with continued reference to FIGS. 1, 2A, and 2B, a dataflow diagram illustrates various embodiments of a payload tracking system 200 for a work vehicle (10, 12). Various embodiments of the payload tracking system 200 according to the present disclosure may include any number of sub-modules shown in FIG. 2. As may be appreciated, the sub-modules shown in FIG. 2 may be combined and/or further partitioned to similarly associate the associated input data 212 with an identifier (vehicle 254, operator 270), to output incremental change in total productivity, to output incremental change in location for payloads, to output incremental change in the fuel level for the respective work vehicle, and other tracking metrics 214. The output of tracking metrics 214 hereby advantageously allows the operator to modify the work plan based on the end product to be achieved, and make modifications with respect to operators, equipment, to name a few, to optimize the time used.

The data manager module 272 of the computing device 44 on the work vehicle, or on remote processing system 62 receives as input the volume data 222 from the volume data sensor 152; receives the location data 224 from the location tracker 160; and the operation data 226 derived from an accelerometer 167 on the beacon 165, position sensors 51 from the hydraulic actuators or corresponding to commands from the user input interface 46, collectively referred to as associated input data 212. The data manager module 272 may further associate fuel level data 268 and unique operator identifier data 270 with the associated input data 212 to generate associated current cycle data 274. Thus, the associated current cycle data 274 comprises the data associated with the particular work vehicle for a particular payload. Associated current cycle data 274 may include incremental volume change data, incremental location change data, incremental fuel level change data, incremental density change data, etc. The memory stores the associated current cycle data 274 for the computational module to generate various tracking metrics. It will be understood that the use of time stamps 292 and a vehicle identifier 254 when receiving data, may also be employed.

Tracking metrics 214 may include tracking aggregated payloads per location to view productivity at a worksite over various time increments, as shown in FIG. 4. Tracking metrics may also include measuring productivity on a granular scale based on a specific work vehicle, specific operator wherein the tracking metric may calculate collective payload moved by a specific work vehicle and/or specific operator. Tracking metrics 214 may also identify work vehicles with inefficiencies in fuel burn rate given the payload moved, thereby identifying work vehicles in need of service. These are one of several examples productivity the associated data input, operator identifier, and the fuel level data provide.

FIG. 3 further demonstrates the vehicle communication component 60 communicatively coupled to the computing device 144. Upon triggering of proximity sensors 169 configured to detect a haulage work vehicle 10 within a predefined range of the work vehicle 12, a unique haulage identifier 254 from the haulage vehicle 10 is received. Furthermore, this enables communication between computing device 144 and computing device 44, tracking payloads from a work vehicle 12 to a haulage work vehicle 10.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A work vehicle for tracking a payload through a dump cycle, the work vehicle comprising:
   an implement;
   a volume sensor including an imaging device configured to sense a volume of material in the implement and generate a corresponding volume data signal;
   a location tracker configured to generate a location data signal indicative of the location of the implement;

an operation sensor including an accelerometer configured to detect an operation characteristic of a dump cycle of the implement and generate an operation data signal indicative of the operation characteristic; and a computing device including a processor and a memory having a payload tracking algorithm saved thereon, wherein the processor is operable to execute the payload tracking algorithm to:

receive the volume data signal from the volume sensor;

receive the location data signal from the location tracker;

receive the operation data signal from the operation sensor;

associate the volume data of the corresponding volume data signal with the location data of the corresponding location data signal and the operation data of the corresponding operation data signal, together to define an associated data input, wherein the location data comprises one or more of a global positioning system data and an absolute location data from a known base point, and a relative implement height from a ground surface;

store in the memory the associated data input for generating a tracking metric corresponding to the payload; and display on a user input interface the tracking metric of the payload.

2. The work vehicle of claim 1 wherein the operation characteristic comprises one or more of a load position, a rollback position, and a dump position.

3. The work vehicle of claim 1, further comprising a proximity sensor configured to detect a haulage vehicle within a predefined range, and receive a unique haulage identifier from the haulage vehicle within the predefined range; the computing device associating the associated data input with the unique haulage identifier.

4. The work vehicle of claim 1, wherein the computing device transmits the associated data input to a remote processing system remote from the work vehicle.

5. The work vehicle of claim 1, wherein the work vehicle further comprises a fuel sensor configured to sense a level of fuel reserve and generate a corresponding fuel reserve data signal, wherein the computing device receives the fuel reserve data signal and computes a productivity based on fuel reserve data corresponding to the associated data input, the productivity including fuel burn rate per the payload.

6. The work vehicle for claim 1, wherein the work vehicle is further configured to detect an operator within the work vehicle, and receive a unique operator identifier from the operator, the computing device associating the associated data input with the unique operator identifier.

7. The work vehicle of claim 1, wherein the relative implement height from a ground surface identifies a modified topography of the ground surface.

8. The work vehicle of claim 4, the remote processing system further comprising a user input interface, the user input interface displaying the associated volume data, location data, and operation data from one or more of the work vehicle, the haulage vehicle, other haulage vehicles and other work vehicles within a worksite area.

9. A payload tracking system to track a payload through a dump cycle, the payload tracking system comprising:

an implement coupled to a work vehicle;

a volume sensor including an imaging device coupled to the implement, the volume sensor configured to sense a volume of material in the implement and generate a corresponding volume data signal;

a location tracker coupled to the implement, the location tracker configured to generate a location data signal indicative of a location of the implement;

an operation sensor including an accelerometer coupled to the implement, the operation sensor configured to detect an operation characteristic of a dump cycle of the implement and generate an operation data signal indicative of the operation characteristic; and a computing device including a processor and a memory having a payload tracking algorithm saved thereon, wherein the processor is operable to execute the payload tracking algorithm to:

receive the volume data signal from the volume sensor;

receive the location data signal from the location tracker;

receive the operation data signal from the operation sensor;

associate the volume data of the corresponding volume data signal with the location data of the corresponding location data signal and the operation data of the corresponding operation data signal, together to define an associated data input, wherein the location data comprises one or more of a global positioning system data point and an absolute location data point from a known base point, and a relative implement height from a ground surface;

store in memory the associated data input for generating a tracking metric corresponding to the payload; and display on a user input interface the tracking metric of the payload.

10. The payload tracking system of claim 9 wherein the operation characteristic comprises one or more of a load position, a carry position, and a dump position.

11. The payload tracking system of claim 9, further comprising a proximity sensor configured to detect a haulage vehicle within a predefined range, and receive a unique haulage work vehicle identifier from the haulage vehicle within the predefined range; the computing device associating the associated data input with the unique haulage identifier.

12. The payload tracking system of claim 9, wherein the computing device transmits the associated data input to a remote processing system remote from the work vehicle.

13. The payload tracking system of claim 9, further comprising a fuel sensor configured to sense a level of fuel reserve and generate a corresponding fuel reserve data signal, wherein the computing device receives the fuel reserve data signal and computes a productivity based on fuel reserve data corresponding to the associated data input, the productivity including fuel burn rate per the payload.

14. The payload tracking system of claim 13, wherein the computing device receives the fuel reserve data signal and computes a productivity based on fuel reserve data corresponding to the associated data input.

15. The payload tracking system of claim 9, wherein the payload tracking system is further configured to detect an operator within the work vehicle, and receive a unique operator identifier from the operator, the computing device associating the associated data input with the unique operator identifier.

16. The payload tracking system of claim 9, wherein the relative implement height from a ground surface identifies a modified topography of the ground surface.

17. The payload tracking system to track a payload through a dump cycle, the payload tracking system comprising:

an implement coupled to a work vehicle;
a volume sensor coupled to the implement, the volume sensor configured to sense a volume of material in the implement and generate a corresponding volume data signal;
a location tracker coupled to the implement, the location tracker configured to generate a location data signal indicative of a location of the implement;
an operation sensor coupled to the implement, the operation sensor configured to detect an operation characteristic of a dump cycle of the implement and generate an operation data signal indicative of the operation characteristic, the operation characteristic including one or more of a load position, a carry position, and a dump position; and
a computing device including a processor and a memory having a payload tracking algorithm saved thereon, wherein the processor is operable to execute the payload tracking algorithm to:
receive the volume data signal from the volume sensor;
receive the location data signal from the location tracker;
receive the operation data signal from the operation sensor;
associate the volume data of the corresponding volume data signal with the location data of the corresponding location data signal and the operation data of the corresponding operation data signal, together to define an associated data input; and
store in memory the associated data input for generating a tracking metric corresponding to the payload; and
transmit the associated data input to a remote processing system remote from the work vehicle, the remote processing system further comprising a user input interface, the user input interface displaying the associated volume data, location data, and operation data from one or more of the work vehicle, the haulage vehicle, other haulage vehicles and other work vehicles within a worksite area.

* * * * *